United States Patent
Racey et al.

(10) Patent No.: US 9,286,429 B2
(45) Date of Patent: Mar. 15, 2016

(54) SYSTEM AND METHOD FOR AMPLIFIER DESIGN

(71) Applicant: ALCATEL-LUCENT CANADA INC., Ottawa (CA)

(72) Inventors: Brian Racey, Ottawa (CA); Igor Acimovic, Gatineau (CA)

(73) Assignee: Alcatel Lucent, Boulogne-Billancourt (FR)

( * ) Notice: Subject to any disclaimer, the term of this patent is extended or adjusted under 35 U.S.C. 154(b) by 69 days.

(21) Appl. No.: 14/144,695

(22) Filed: Dec. 31, 2013

(65) Prior Publication Data

US 2015/0186580 A1     Jul. 2, 2015

(51) Int. Cl.
*G06F 17/50*     (2006.01)
*H03F 1/02*      (2006.01)
*G01R 13/00*     (2006.01)

(52) U.S. Cl.
CPC ........ *G06F 17/5063* (2013.01); *G06F 17/5036* (2013.01); *H03F 1/0288* (2013.01); *G01R 13/00* (2013.01); *G06F 2217/00* (2013.01)

(58) Field of Classification Search
None
See application file for complete search history.

(56) References Cited

U.S. PATENT DOCUMENTS

| | | | | |
|---|---|---|---|---|
| 5,657,221 A * | 8/1997 | Warman et al. | | 700/83 |
| 7,010,773 B1 * | 3/2006 | Bartz et al. | | 716/121 |
| 8,441,326 B1 * | 5/2013 | Bromberger | | H03F 1/0288 333/32 |
| 8,975,955 B2 * | 3/2015 | Acimovic | | G01R 27/02 330/2 |
| 2005/0157382 A1 | 7/2005 | Kafka et al. | | |
| 2009/0138110 A1 * | 5/2009 | Kohyama et al. | | 700/94 |
| 2009/0276721 A1 * | 11/2009 | Brockbank | | 715/764 |
| 2013/0125085 A1 * | 5/2013 | Shimizu | | 716/139 |
| 2013/0332139 A1 * | 12/2013 | Koga | | 703/14 |
| 2014/0062601 A1 | 3/2014 | Acimovic et al. | | |
| 2014/0159808 A1 | 6/2014 | Acimovic et al. | | |

FOREIGN PATENT DOCUMENTS

EP     2495871 A1     9/2012

OTHER PUBLICATIONS

Valleja, "An Approach to Amplifier Frequency Compensation," IEEE Trans. on Education, vol. 46, No. 1, Feb. 2003, pp. 43-49.*
Doherty, "A New High Efficiency Power Amplifier for Modulated Waves," Proc. of the Institute of Radio Engineers, vol. 24, No. 9, Sep. 1936, pp. 1163-1182.*
Naji et al., "A Computer based Simulator for Erbium-Doped Fiber Amplifier," Proc. of the Int'l Conference on Computer and Communication Engineering 2010, May 2010, 5 pages.*

(Continued)

*Primary Examiner* — Leigh Garbowski
(74) *Attorney, Agent, or Firm* — Harness, Dickey & Pierce, P.L.C.

(57) ABSTRACT

At least one example embodiment discloses a method of generating parameters of an amplifier. The method includes displaying, by a processor, a graphical user interface on a display, the graphical user interface associated with input and output parameters of the amplifier, receiving input parameter values for the amplifier, generating output parameter values for the amplifier based on the obtained input parameter values and displaying the generated output values on the display.

17 Claims, 6 Drawing Sheets

(56) References Cited

OTHER PUBLICATIONS

Gurav, P. et al., "A MATLAB based Tool for Microwave Amplifier Analysis," Information and Communication Technologies, 2013 IEEE Conference, pp. 1014-1018, Apr. 12, 2013.

Almeida, T. et al., "GUI model for simulation of steady state Erbium dopped fiber amplifiers," EUROCON-International Conference on Computer as a Tool, 2011 IEEE, pp. 1-4, Apr. 29, 2011.
International Search Report dated Mar. 12, 2015.

* cited by examiner

SYSTEM AND METHOD FOR AMPLIFIER DESIGN

BACKGROUND

Amplifiers may be used in a variety of applications in wireless communication systems. For example, a base station may use an amplifier to amplify a downlink signal. Because wireless communication systems use radio frequency (RF) signals that exhibit high peak-to-average power ratios, amplifiers in such systems must be able to handle significant peak power levels above their average load. For example, amplifiers are most efficient when operating close to their maximum instantaneous output power. The efficiency of the amplifier decreases significantly as the output power level decreases from the maximum level. Thus, amplifier efficiency is a function of the output power level.

For a given power level (significantly lower than the maximum power level), an amplifier will be more efficient if the load impedance seen by the amplifier is high. However, maintaining the high load impedance when output power levels increase will make the amplifier saturate at a lower power level than originally designed. Saturation leads to signal distortion. When the amplifier operates in a low power regime, the load impedance is increased to improve the efficiency, and when the amplifier operates in a high power regime, the load impedance is decreased in order to avoid saturation. This load impedance modulation as a function of the signal power level is achieved by a Doherty amplifier. For instance, the Doherty amplifier improves amplifier efficiency by reducing the amplifier's saturated power level when the signal level is low, yet ramps up to full power capability when the signal peaks.

A Doherty amplifier has a main amplifier branch and one or more peak amplifier branches that are designed to enable the amplifier to provide high-power amplification by supplementing the amplification provided by the main branch during peak power operations. During normal power operations, the peak branches may be disabled such that high-efficiency amplification is provided by only the main branch.

Certain conventional design practices for Doherty amplifiers rely on Class-AB load-pull data and/or non-linear models in circuit simulators to characterize active devices. The design process is mainly based on manual calculations derived from Doherty design principles and limited load-pull data. Designers make many assumptions such as what input power split to use, which impedance modulation ratio to use, and which gain and compression values to use for each device. Such assumptions might not be accurate and may cause large discrepancies between expected and achieved performance characteristics of the resulting Doherty amplifier, leading to missed milestone deadlines and lower performance capabilities of the amplifier. The deviations from the desired performance are discovered only after the first prototypes are built and tested, at which point it is usually too late to make major changes to fix problems caused by faulty assumptions. Deviations that can be fixed involve manual tuning on the bench, which is a costly, time-consuming, and laborious process with no guarantees of success. Since the tuning is done on a small sample of prototypes, there is no guarantee that the solution will be optimal for large-scale production.

Moreover, rapid hardware design is important to expand to existing markets and penetrate new markets and generally requires a great deal of knowledge regarding the correct parameters to specify, equations to use, rules of thumb, etc.

SUMMARY

Designs could be rapidly produced if designers with less training could use a point and click interface to design a power amplifier.

The inventors have discovered a method and apparatus to reduce the guess work of designing power amplifiers by abstracting the design parameters to the point where the input required is reduced to obtain and verify the desired output response. The method and apparatus incorporates the design and analysis of Doherty amplifiers, as described in U.S. application Ser. No. 13/605,106, filed Sep. 6, 2012 and Ser. No. 13/710,605, filed Dec. 11, 2012, the entire contents of each of which is hereby incorporated by reference.

At least one example embodiment discloses a method of generating parameters of an amplifier. The method includes displaying, by a processor, a graphical user interface on a display, the graphical user interface associated with input and output parameters of the amplifier receiving input parameter values for the amplifier, generating output parameter values for the amplifier based on the obtained input parameter values and displaying the generated output values on the display.

In an example embodiment, the displaying the graphical user interface includes displaying possible input parameter values associated with the input parameters.

In an example embodiment, the input parameter values include amplifier performance specifications and an active device characterization of the amplifier, the performance specifications including at least one of power, gain, efficiency and linearity of the amplifier, and the active device characterization being based on load-pull data of the amplifier.

In an example embodiment, the method further includes displaying load-pull contours as the active device characterization.

In an example embodiment, the receiving input parameter values includes, receiving a set of the possible input parameter values, the set including the obtained input parameter values, each of the values in the set associated with a different input parameter, the selected set identifying impedance points of the amplifier; and dynamically displaying performance characteristics of the amplifier in response to the selecting.

In an example embodiment, the displaying the graphical user interface displays load-pull data associated with the input parameters, the load-pull data identifying at least three sets of load-pull data characterizing salient states of active devices in operation of the amplifier.

In an example embodiment, the load-pull data includes (i) load-pull data for a main branch high efficiency operating mode of the amplifier, (ii) load-pull data for a main branch high-power operating mode of the amplifier and (iii) load-pull data for a peak branch high-power operating mode of the amplifier.

In an example embodiment, the generating includes, generating design parameter values of the amplifier in real time in response to obtaining the input parameter values, the design parameters including impedances presented to active devices of the amplifier, S-parameters of the amplifier and a modulation ratio of the amplifier.

In an example embodiment, a number of the input parameters is less than a number of the output parameters.

In an example embodiment, the displaying the graphical user interface includes, displaying first input parameter values alongside second input parameter values, the first input parameter values being for a main amplifier branch of the amplifier and the second input parameter values being for a peak amplifier branch of the amplifier.

In an example embodiment, the amplifier is a power amplifier.

In an example embodiment, the power amplifier is one of a single ended, balanced, push-pull, 2-way, 3-way and N-way Doherty amplifier.

In an example embodiment, the method further includes building the amplifier based on the generated output parameter values.

At least one example embodiment discloses a system configured to generate parameters of an amplifier. The system includes a processor configured to, display a graphical user interface on a display, the graphical user interface associated with input and output parameters of the amplifier, receive input parameter values for the amplifier; generate output parameter values for the amplifier based on the obtained input parameter values, and display the generated output values on the display.

In an example embodiment, the processor is configured to cause the display to display possible input parameter values associated with the input parameters.

In an example embodiment, the input parameter values include amplifier performance specifications and an active device characterization of the amplifier, the performance specifications including at least one of power, gain, efficiency and linearity of the amplifier, and the active device characterization being based on load-pull data of the amplifier.

In an example embodiment, the processor is configured to cause the display to display load-pull contours as the active device characterization.

In an example embodiment, the processor is configured to receive a set of the possible input parameter values, the set including the obtained input parameter values, each of the values in the set associated with a different input parameter, the selected set identifying impedance points of the amplifier, and cause the display to dynamically display performance characteristics of the amplifier in response to the selecting.

In an example embodiment, the processor is configured to cause the display to display load-pull data associated with the input parameters, the load-pull data identifying at least three sets of load-pull data characterizing salient states of active devices in operation of the amplifier.

In an example embodiment, the load-pull data includes (i) load-pull data for a main branch high efficiency operating mode of the amplifier, (ii) load-pull data for a main branch high-power operating mode of the amplifier and (iii) load-pull data for a peak branch high-power operating mode of the amplifier.

In an example embodiment, the processor is configured to generate design parameter values of the amplifier in real time in response to obtaining the input parameter values, the design parameters including impedances presented to active devices of the amplifier, S-parameters of the amplifier and a modulation ratio of the amplifier.

In an example embodiment, a number of the input parameters is less than a number of the output parameters.

In an example embodiment, the processor is configured to cause the display to display first input parameter values alongside second input parameter values, the first input parameter values being for a main amplifier branch of the amplifier and the second input parameter values being for a peak amplifier branch of the amplifier.

In an example embodiment, the amplifier is a power amplifier.

In an example embodiment, the power amplifier is one of a single ended, balanced, push-pull, 2-way, 3-way and N-way Doherty amplifier.

BRIEF SUMMARY OF THE DRAWINGS

Example embodiments will be more clearly understood from the following detailed description taken in conjunction with the accompanying drawings. FIGS. 1-4 represent non-limiting, example embodiments as described herein.

DETAILED DESCRIPTION

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. For example, program modules and functional processes discussed herein may be implemented using existing hardware (e.g., a processor). Such existing hardware may include one or more processors, digital signal processors (DSPs), application-specific-integrated-circuits, field programmable gate arrays (FPGAs) computers or the like.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

This application refers to U.S. application Ser. No. 13/605,106, filed Sep. 6, 2012 and Ser. No. 13/710,605, filed Dec. 11, 2012, the entire contents of each of which is hereby incorporated by reference.

Figure 1:
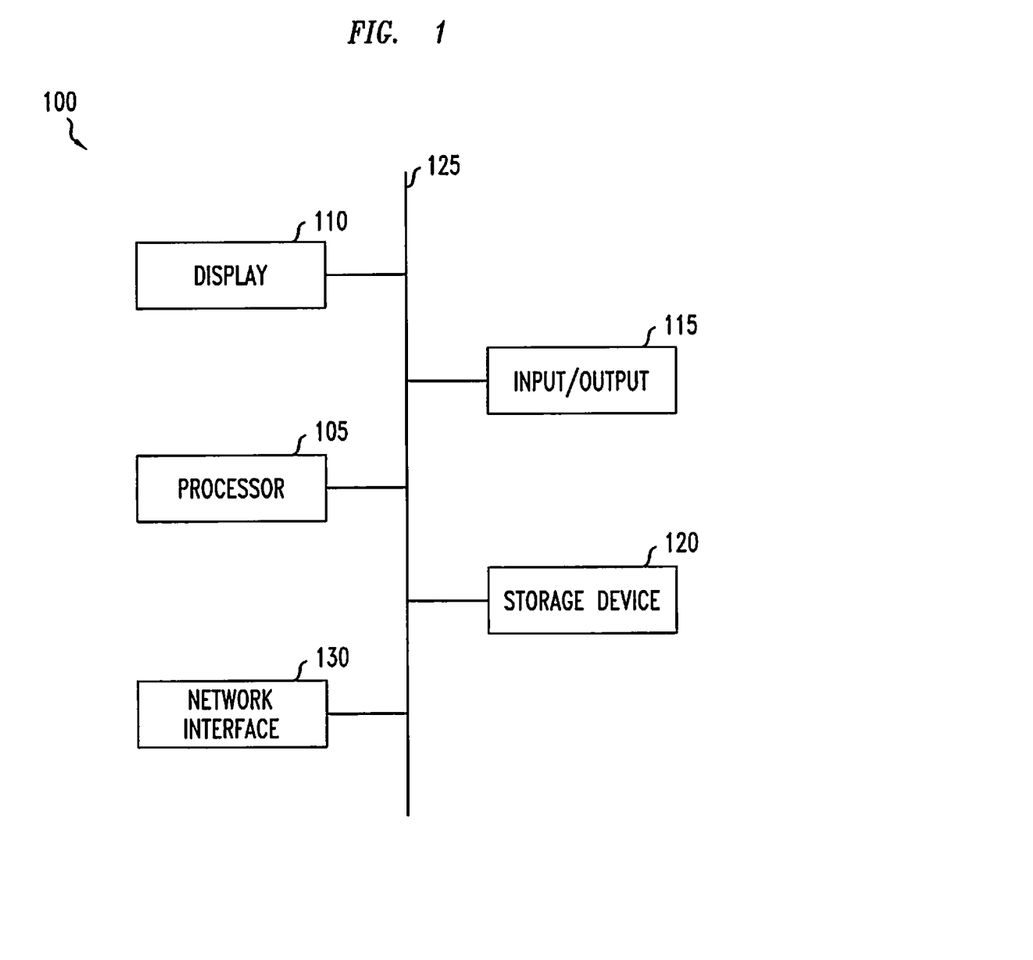
FIG. 1 illustrates a system for designing an amplifier, according to an example embodiment.

FIG. 1 illustrates a system for designing an amplifier, according to an example embodiment. As shown, the system 100 includes a processor 105, a display 110, an input/output 115, a storage device 120 and a network interface 130, all configured to communicate with each other using a system bus 125. The bus 125 may comprise a high-speed serial bus, parallel bus, storage area network (SAN), and/or other suitable communication technology. The network interface 130 is a computer hardware component that connects the system 100 to a computer network. The network interface 130 may connect the system 100 to a computer network via a wired or wireless connection.

The input/output 115 is configured to receive inputs from a user. The processor 105 is configured to process the inputs received from the input/output 115 and is configured to cause the display 110 to display the inputs from the input/output 115 as well as outputs generated by the processor 105.

For example, the input/output 115 may receive input parameter values from a user. The input parameters may be independent variables such as amplifier performance specifications, active device characterization in the form of load-pull data. Amplifier performance specifications include at least one of power, gain, efficiency, linearity of the amplifier, input return loss and compression. The active device characterization may be based on load-pull data.

The processor 105 may be configured to carry out instructions of a computer program by performing arithmetical, logical, and input/output operations of the system. Instructions may be provided to the processor 105 by the storage device 120 via the bus 125.

The processor 105 is configured to obtain the input parameter values for the amplifier and generate output parameter values for the amplifier by executing the methods and equations described in U.S. application Ser. Nos. 13/605,106 and 13/710,605 that are stored in the storage device 120. The output parameters are dependent (calculated) variables such as impedances presented to active devices of the amplifier, S-parameters of the amplifier and a modulation ratio of the amplifier. Other possible input/output parameters include expected output power, phase alignment between the branches, input power split ratio (constant for fixed split Doherty amplifiers and power dependent for Digital Doherty amplifiers), off-state peak branch load impedance loading a combining node of the amplifier, high efficiency power back-off ratio.

The processor 105 is configured to cause the display 110 to display the output parameter values for the amplifier by sending the output parameter values to the display 110 through the data bus 125.

The storage device 120 may be a computer readable storage medium that generally includes a random access memory (RAM), read only memory (ROM), and a permanent mass storage device, such as a disk drive, for example. Software components may also be loaded from a separate computer readable storage medium into the storage device 120 using a drive mechanism (not shown). Such separate computer readable storage medium may include a floppy drive, disc, tape, DVD/CD-ROM drive, cloud storage (accessed using the network interface 130) or memory stick/card. The loaded software components may be executed by the processor 105.

Figure 2:
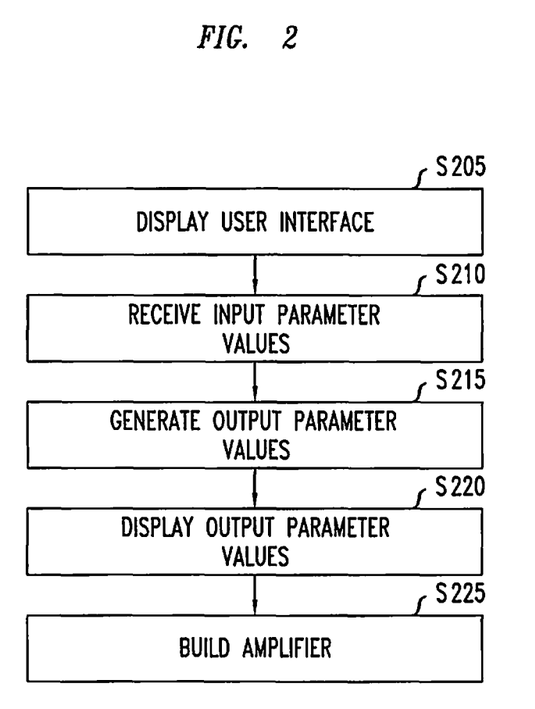
FIG. 2 illustrates a method of generating parameters of an amplifier, according to an example embodiment.
Figure 3A:
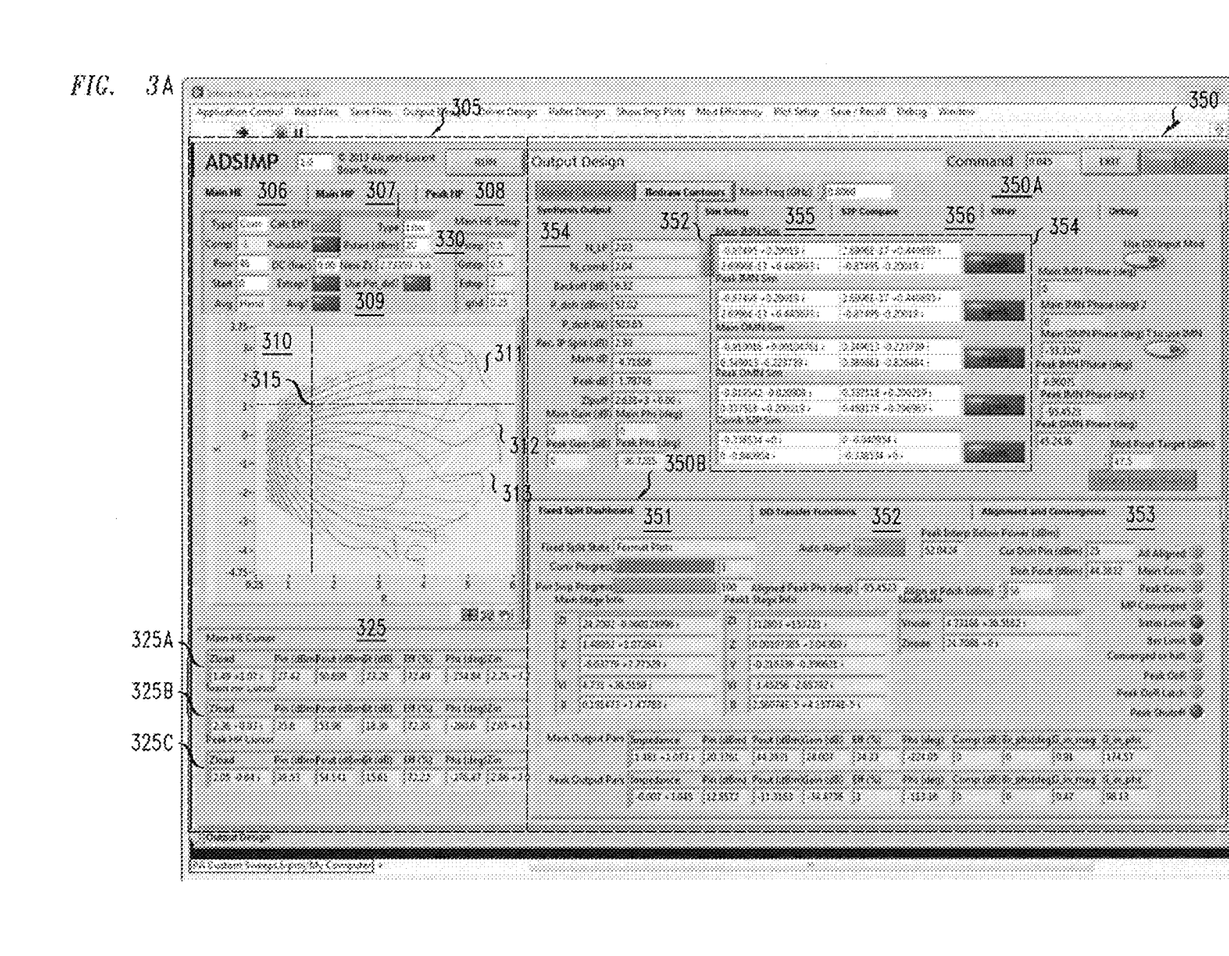
FIG. 3A illustrates an example embodiment of a user interface that implements the method of FIG. 2.

FIG. 2 illustrates a method of generating parameters of an amplifier, according to an example embodiment. FIG. 3A illustrates an example embodiment of a user interface that implements the method of FIG. 2. The processor 105 causes the display 110 to display the user interface and the processor 105 processes inputs and outputs of the user interface. Inputs of the interface are obtained by the input/output 115.

Referring to FIG. 2, the processor 105 causes the display 110 to display the graphical user interface at S205. The graphical user interface is associated with input and output parameters of the amplifier.

As shown in FIG. 3A, the user interface includes an input section 305 and an output section 350. The input section identifies input parameters for a user to enter values corresponding to the input parameters. The output section 350 displays output parameter values generated by the processor 105.

The input section 305 has tabs for a main branch high efficiency region of operation 306, a main branch high-power region of operation 307 and a peak branch high-power operating mode 308. A mode of operation may also be referred to as a regime of operation or region of operation.

Input parameters for the high power mode for all branches (main branch and one or more peak branches) may be the output power requirement (sum of output powers from all branches meet the output power specification for the Doherty amplifier as a whole). In addition to the power requirement for high power modes, efficiency and gain are determined to meet the reminder of the Doherty amplifier specifications (these parameters are maximized or otherwise adjusted). The selection of impedances for power values in the high power mode determine a combining node impedance modulation ratio $N_{comb}$ whose value guides the user in the selection of impedance in main device high efficiency contours by trying to match main device impedance modulation ratio $N_{LP}$ whose value is a function of the main device high power impedance and main device high efficiency impedance (this selection is also affected by efficiency and achieving a high efficiency backoff power ratio). Once $N_{LP}$ and $N_{comb}$ are sufficiently matched, the design is viable, as described below.

It should be understood that additional tabs may be added for each additional branch in a 3-way or N-way Doherty amplifier. In section 309, type allows a user to select between viewing constant input power, constant output power or constant compression contours. It should be understood that contours could be plotted against other metrics kept constant such as gain and efficiency.

The implications of plotting against these other metrics are that the visualization will change and the user will need to adapt to the display, but the resulting design and simulation will not be impacted. Comp is an entry box for entering the degree of compression plotted when constant compression is selected as the underlying load pull constant axis. Pow is an entry box for entering the power (input or output) when plotting against constant power. Calc Eff, PulseIds and DC (frac) controls whether a drain efficiency is calculated from output power, output voltage, output current or if it is read directly from the load pull data.

Avg, Extrap? Avg?, Type, Pstart (dBm) control additional post-processing of the load pull data to apply smoothing, discard erroneous data and extrapolate data beyond the measured range, when needed, to provide data beyond measured data. This is used due to the limit of a measurement range of a physical load pull system and the behaviour of a simulation engine in particular operating regimes of the overall amplifier. One example of one such regions is when the peak device turns on and off since this is a highly non-linear region of the peaking transistors. Use Pin_del is a debug boolean to control how the input matching network interacts with the load pull data. While certain parameters are shown in section 309, it should be understood that section 309 is not limited to the parameters shown in FIG. 3.

The input section 305 includes an input parameter value selection area 310 that displays load-pull data for the selected tab 306. The input parameter value selection area 310 illustrates load-pull contours for power 311, efficiency 312 and gain 313 for the main branch high efficiency region of operation. Consequently, in FIG. 2, the input parameters are power, efficiency and gain and the load-pull contours illustrate possible values for the power, efficiency and gain.

The input section 305 also includes a key area 330 which illustrates the scale of the load-pull contours. For example, the key area 330 shows that the difference between power contours is 0.5 dB, the difference between gain contours is 0.5 dB and the difference between efficiency contours is 2.

At S210, the processor receives input parameter values. A user is able to move a cursor 315 along the load-pull contours. The cursor 315 may be moved using any know interface such as mouse, keyboard and/or touchscreen.

The location of the cursor 315 represents the values of the input parameters and determines the operating characteristics of the amplifier. As the user drags the cursor 315, the processor 105 registers the coordinates of the cursor 315 and performs impedance matching. The impedances and associated power, efficiency and gain values of the coordinates of the cursor 315 are then displayed in section 325.

In an example embodiment, anytime the user ends movement of the cursor by releasing the mouse, the impedances and associated power, efficiency and gain values of the coordinates are updated.

Accordingly, the location of the cursor 315 presents a collection of data to the user which requires no knowledge on the part of the user regarding how the data files are structured.

Figure 4:
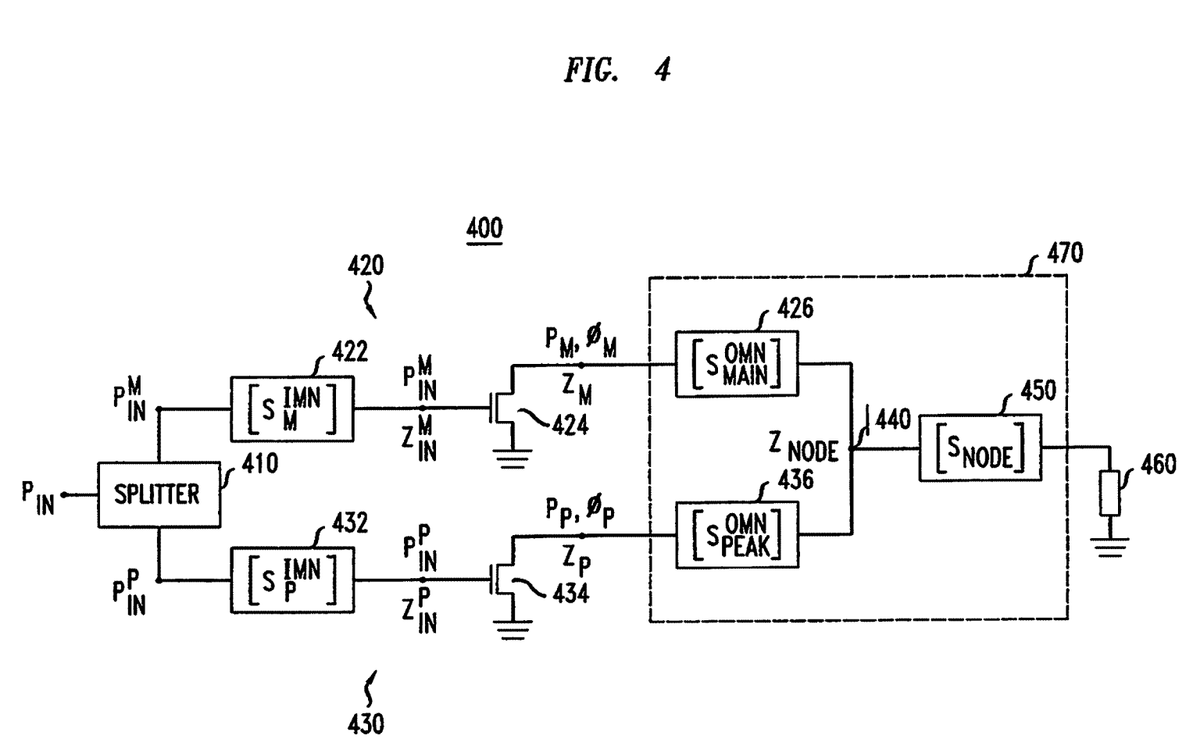
FIG. 4 illustrates a two-way Doherty amplifier according to an example embodiment.

The load pull-data is generated as follows with reference to FIG. 4. FIG. 4 illustrates a two-way Doherty amplifier 400.

A main amplifier branch 420 consists of a cascade of a main input matching network 422, a main amplifier device (e.g., transistor) 424, and a main output matching network 426, while peak amplifier branch 430 consists of a cascade of a peak input matching network 432, a peak amplifier device (e.g., transistor) 434, and a peak output matching network 436. An input signal is applied to an input power splitter 410, which splits the input signal power according to a fixed ratio between the main amplifier branch 420 and the peak amplifier branch 430. Output signals from the main and peak amplifier branches are combined at combining node 440 where branches 420 and 430 meet, and the resulting combined signal is delivered to the output load 460 through node matching network 450.

For low signal power operation, peak amplifier branch 430 is inactive (e.g., this is achieved by biasing peak device 434 in Class-C), such that all amplification is provided by main amplifier branch 420. During high signal power operation, peak amplifier branch 430 is active (e.g., the signal amplitude is large enough to turn on peak amplifier device 434), such that amplification is provided by both main amplifier branch 420 and peak amplifier branch 430. The intended intermittent operation of the peak amplifier device 434 is achieved by operating it as a Class-C amplifier, while main amplifier device 424 functions as a Class-AB amplifier. The goal is to maximize efficiency of operation, which means bias should be minimized wherever possible. To achieve higher efficiency, some of the maximum linearity of operation of Class-A mode is traded off for efficiency by going to Class-AB mode. The tradeoff could be anywhere between Class-A and Class-B. Hence, Class-AB which can vary from very close to Class-A to very close to Class-B. This is a designer's choice.

The transfer function of each of the five matching networks 422, 426, 432, 436, and 450 may be represented by an S matrix that transforms complex incident voltages into complex reflected voltages according to Equation (1) as follows:

$$\begin{bmatrix} V_1^- \\ V_2^- \end{bmatrix} = \begin{bmatrix} S_{11} & S_{12} \\ S_{21} & S_{22} \end{bmatrix} \begin{bmatrix} V_1^+ \\ V_2^+ \end{bmatrix} \quad (1)$$

where $V_1^+$ and $V_2^+$ are the complex voltage waves incident on ports 1 and 2, respectively, $V_1^-$ and $V_2^-$ are the complex voltage waves reflected from ports 1 and 2, respectively, and $S_{ij}$ are the four S-matrix parameters. From these voltages and S-parameters, the relevant impedances can be derived for matching networks 422, 426, 432, 436, and 450, and vice-versa.

The design of two-way Doherty amplifier 400 of FIG. 4 focuses on three main regions of the architecture: input power splitter 410, main and peak output matching networks 426 and 436, and node matching network 450. The output combining network 470 (consisting of the main, peak, and node matching networks 426, 436, and 450) is designed based on the combining node impedance modulation ratio $N_{comb}$, which is a function of the maximum power delivered by the main and peak branches. The impedance modulation ratios are selected using the high-compression main and peak amplifier device load-pull contours (for example, 3 dB for the main device and 1 dB for the peak device) in order to realize the given specification of maximum output power requirements.

The user can intentionally select power levels in the high power load-pull contours of the main and peak devices that will produce the value of the impedance modulation ratio that a user desires. Additionally, the user can start with any set of power values and tinker with them until a desired value of the impedance modulation is achieved. The value of the impedance modulation ratio is calculated by the processor 105 based on the user selected positions in the load-pull contours. The value may have any value in the range from about 1.5 to about 4; however, values from about 2 to about 3 will have practical application for use with actual devices. Since the main and peak devices operate under different bias conditions, they will have different gains at different power levels.

To design two-way Doherty amplifier 400 of FIG. 4, (at least) three sets of load-pull contours are used at each frequency of interest. For the main device 424, two sets of constant-compression load-pull contours are used, for example, high-compression (3 dB compression or higher) load-pull contours for selection of high-power impedance and low-compression (circa 1 dB compression) load-pull contours for high-efficiency impedance that are obtained for the main device operating under Class-AB bias conditions.

Each set of constant-compression contours has an impedance that has the highest power and an impedance that has the highest efficiency of all other impedances in the set. A high-compression (3 dB or higher) set is used to select a high-power impedance, and a low-compression (1 dB or so) set is used to select a high-efficiency impedance. The high-efficiency impedance will have a lower power associated with it; whereas, the high-power impedance may have lower efficiency associated with it. 1 dB compression is lower compression than 3 dB. The main device is presented with high-efficiency/low-power impedance until it reaches 1 dB compression; at which point, the peak branch turns on and starts modulating the load impedance of the main branch from the high-efficiency/low-power point toward the high-power impedance point, while increasing the compression of the main device which will eventually end in high-power impedance in 3 dB compression (or higher) contours. For the peak device 434, one set of constant-compression load-pull contours obtained under Class-C bias conditions is used, for example, high-power, 1 dB-compression contours, as well as measurement of the off-state impedance of peak device 434 for average-power operations during which peak device 434 is disabled. Because a Class-C device has lower gain, it will undergo lower compression. For the case of the peak device, 1 dB compression can be considered high compression. The compression is the amount of gain decrease from the maximum level. Since the peak device has lower maximum gain due to its Class-C bias, it cannot be compressed too much before its gain becomes inadequate. Hence, 1 dB compression is considered high for the peak device. P1 dB is the power under 1 dB gain compression. XdB refers to gain compression, and PXdB refers to power delivered under that compression. XdB is used when referring to constant compression contours, and PXdB is used when refereeing to specific power within those contours. These three load-pull contours are obtained by measuring the devices that will be used in the actual amplifier design as the main and peak devices 424 and 434.

Load-pull data is obtained for the devices that will be used in the amplifier design and construction. The devices are measured under the same (or similar) biasing and power conditions under which they are intended to be used. The load-pull data consists of input power sweeps done for each load impedance presented to the device. The load-pull setup consists of a vector signal generator, source impedance transformer (e.g., source tuner+device input fixture), the device under test (e.g., transistor), load impedance transformer (e.g., load tuner+device output fixture), and vector signal receiver. A set of load impedances for the test is selected. Several trial measurements may be needed to determine the optimal set of load impedances. Once the device is biased to obtain desired operating conditions, for every load impedance presented to the device by the load impedance transformer, the input power is swept over a prescribed range, and various performance parameters of the transistor (e.g., 424 and 434) are recorded (e.g., output power, gain, efficiency, AM-PM, insertion phase, drain current, etc.). The measurements have the following nesting:

Set bias
  Set frequency
    Set load impedance
      Sweep input power and collect measured data
    Next load impedance
  Next frequency
Next bias The measurements are taken for various biasing conditions (Class-AB, Class-B, Class-C of various depths). The measurements are often done for more than one frequency to get better characterization over frequency. The measured data provides the relationship between input and the output of the active device under various loading conditions, such as those that occur in the Doherty amplifier where two branches interact at the node. The data allows one to calculate the response from the transistor based on the interactions of the branch signals at the combining node which are power dependent. The data obtained at each frequency of interest is used to characterize amplifier performance at that frequency. For each load impedance, the device (keeping the same input power conditions) will have different performance regarding output power, gain, and efficiency.

Based on the specification, the user needs to select impedances that will yield performance sufficient to meet the amplifier specifications. Load-pull data allows the user to pick an impedance that satisfies the high-power requirement for the main device, an impedance that satisfies the high-efficiency requirement at power back-off for the main device, as well as an impedance that satisfies the high-power requirement for one or more peak devices. In the design synthesis procedure, the load-pull data are plotted in constant-compression contour format to facilitate the visual selection of the impedances. Once the user makes the impedance selection based on amplifier specifications (e.g., power, efficiency and gain) and subject to restrictions imposed by the synthesis algorithm (to ensure that the solution can be implemented), the processor 105 generates output parameters.

Referring back to FIG. 3A, the section 325 includes areas 325a, 325b and 325c. Each area 325a, 325b and 325c identifies an impedance load, input power, output power, gain, efficiency phase and input impedance for a corresponding mode of operation (high efficiency, high power, peak high power). Consequently, parameter values for a main device of the amplifier and parameter values for the peak device are displayed alongside each other.

For example, the selected impedances (impedances generated by the processor 105 based on the location of the cursor 315) and associated power, efficiency and gain values are displayed in section 325a in the area that corresponds to the selected tab 306. In FIG. 3A, the tab 306 is selected. Therefore, the main he cursor area 325a is updated. The parameters in section 325 may be considered design input parameters. The user will evaluate these parameters to determine whether they meet the desired output performance requirements. The location of the cursor 315 identifies the performance metrics of a single transistor for the respective mode of operation (main high power, main high efficiency, peak high power). The mode of operation encompasses the composite operating point of the overall amplifier. Each cursor includes input and output power and the parameters which result (gain, efficiency, phase, etc.). All data contained in the load pull files are accessible by the cursor 315, but not all are necessarily displayed for the user. Other load pull parameters are mostly used for the simulation engine and not displayed. Further, each mode of operation may be defined by combinations of input power, output power, gain compression or any combination thereof.

At S215, the processor 105 generates output parameter values associated with the obtained input parameter values that correspond to the location of the cursor 315. The processor 105 causes the display 110 to display the generated output parameter values in the user interface at S220, shown in FIG. 3A. At S225, the generated output parameter values allows a user to build and implement an amplifier.

Referring to FIG. 3A, the output section 350 displays output parameter values generated based on the location of the cursor 315 in a synthesis output tab 354. The values displayed in an upper half 350A of the section 350 are updated each time the cursor 315 is moved to a new location, and as such are updated dynamically by the processor.

The "Update Calculations" button is a button which launches a simulation. The "Update Calculations" button captures all of the data used for the simulation and launches the simulation engine. The simulation launch evaluates the composition of the input matching networks, output matching networks, selected input power split, and operating point of the transistor dictated by the specified load pull over a range of stimulus values specified on a Sim Setup tab 355. Prior to the simulation launch, a user may select power sweep start, stop and step values and a desired power split between the main and peak branches (or any number of branches in an N-way amplifier) using the Sim Setup tab 355. The power split may or may not match the recommended split ratio (Rec. IP Split) and is ultimately determined by the end user.

The user interface displays values for modulation ratios N_LP ($N_{LP}$) and N_comb ($N_{comb}$), backoff, Pdoh, recommended split between main and peak branch (Rec. IP Split), main branch power, peak branch power and Zlpoff. P_DOH is the output power of the Doherty amplifier as a whole (composite power of main and all the peak branches combined) at this stage (before actual simulation has been run). The P_DOH is obtained under assumption that output powers from all branches combine in phase, which is used as a guideline for the user until simulation returns actual output power obtained with all factors taken into consideration. Zlpoff is the off-state load impedance of the peak branch(es) loading the combining node of the Doherty amplifier (where main and peak branches meet). Zlpoff gives the user an idea of what is an achievable value given the off-sate impedance of the peak device and user's peak device high power impedance selection.

As shown, the number of output parameters is greater than the number of input parameters.

The output section 350 also includes an indicator 352 to indicate whether the modulation ratios N_LP and N_comb are acceptable. In an example embodiment, if the modulation ratios are acceptable N_LP and N_comb, the indicator 352 is green. However, if the modulation ratios do not fit within the other output parameter values based on the input parameter values, the indicator 352 is not green.

The output section 350 also outputs S-parameters in an S-parameter section 354 for the matching networks 422 (Main IMN), 432 (Peak IMN), 426 (Main OMN) and 436 (Peak OMN). A S2P compare tab 356 is a short-hand notation indicating two-port S-parameter files or parameter themselves.

The generated output parameter values are generated by the processor using the methods and equations described in U.S. application Ser. No. 13/710,605.

As described above, the system 100 is configured to generate a number of output values based on a reduced number of inputs (e.g., 3). Moreover, the system 100 provides outputs in a dynamic fashion based on the reduced number of input values.

A fixed split dashboard 351 in lower half 350B is a visualization of a simulation (e.g., in U.S. application Ser. No. 13/710,605) process that the user may monitor to evaluate whether the simulation is behaving normally. The fixed split dashboard 351 is similar to a status or busy window of any software which provides feedback into the operations being performed. The fixed split dashboard 351 provides the user with information on overall progression of the simulation (iterations to convergence, main converged, peak converged, etc.) and if monitored by the user it gives the indication which stimulus points were slowest to converge (where the design might have possible issues in implementation).

Auto Align? is a boolean operator which allows the user to specify that the simulation engine should determine the optimal phase alignment between branches at the specified Pdoh (dBm) output power (power delivered to load 460). If the boolean is configured as false, then the user enters a desired value in Peak Phs (deg). The Aligned Peak Phase (deg) reports the actual phase that is used during the simulation (either selected by the simulation engine [true] or by the user [false]). Aligned Peak Phase (deg) is the phase difference between the transistor branches resulting from the transistors, input matching networks, output matching networks. The phase for each branch is the cumulative phase resulting from the sum of the phase of matching networks 422, 424, 426 for the main branch and matching networks 432, 434, 436 for the peak branch.

An Alignment and Convergence tab 353 provides a variety of inputs which control how the simulation engine achieves phase alignment and converges on a solution to the equations presented in the previous patent applications.

"DD" in a DD Transfer Functions tab 352 stands for Digital Doherty and it is a Doherty amplifier where the input power splitter 410 is removed and the input to each Doherty branch is instead fed by an independent baseband to RF chain consisting of digital signal processor (DSP), digital to analog converter (DAC), IQ modulator and various gain stages. The benefit of this type of design approach is that a significant degree of DSP may be applied to each branch input signal to account and correct for variations in devices, thermal response, manufacturing, frequency response, etc. A conventional Doherty amplifier takes one digital signal converted to analog and splits it between branches where each branch actually has vastly different requirements for optimal operation. In a digital Doherty amplifier, each branch may be driven resulting in an overall improved performance due to increased flexibility and degrees of freedom.

The DD Transfer Functions tab 352 contains a set of controls for implementing a DSP to emulate imperfections, correct for them and improve drive signals. Generally speaking, this is a new feature and is generally unavailable right now in RF design tools which interact with measured data representing a physical device. The DD Transfer Functions tab 352 permits a user to sculpt and shape an input signal driving each branch and consequently qualify what, if any, benefits could be obtained by implementing a digital Doherty amplifier versus a conventional amplifier and to further quantify those benefits to support the design decision making process.

Figure 3B:
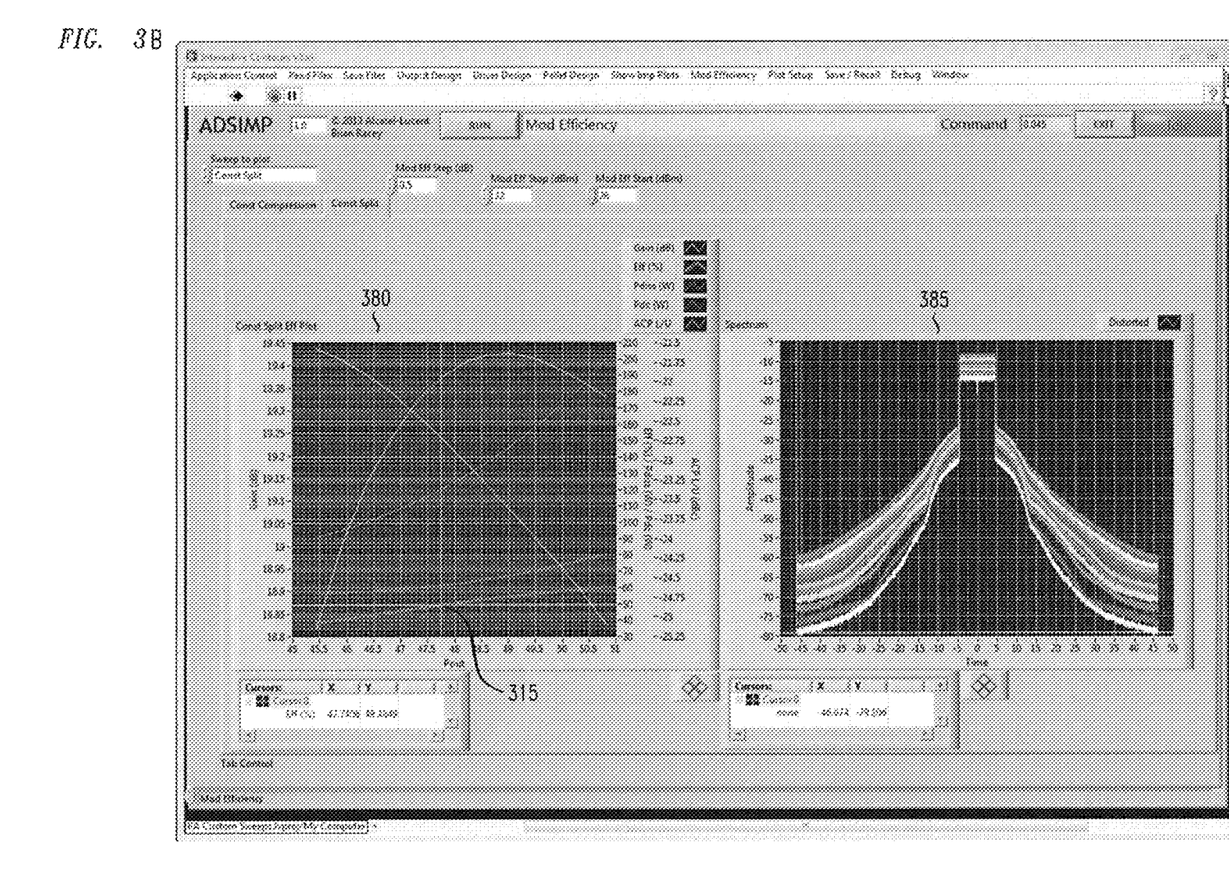
FIGS. 3B-3C illustrate plots of output parameters according to an example embodiment.

The processor 105 is also configured to cause the display to display plots as shown in FIG. 3B. In FIG. 3B, a plot 380 illustrates a zoomed in view of the load-pull contours shown in FIG. 3A. A plot 385 generates a Fast Fourier Transform plot based on the input values of the power, gain and efficiency. The plot 385 (spectrum display) is an FFT of the loaded modulated waveform (I and Q data) after being passed through A non-linear transfer function. This transfer function is complex in that it includes both amplitude and phase and is determined by the complex ratio (Vout/Vin) where Vout is the resulting complex voltage waveform at the amplifier load terminal 460 and Vin is the complex voltage waveform entering the splitter 410.

Figure 3C:
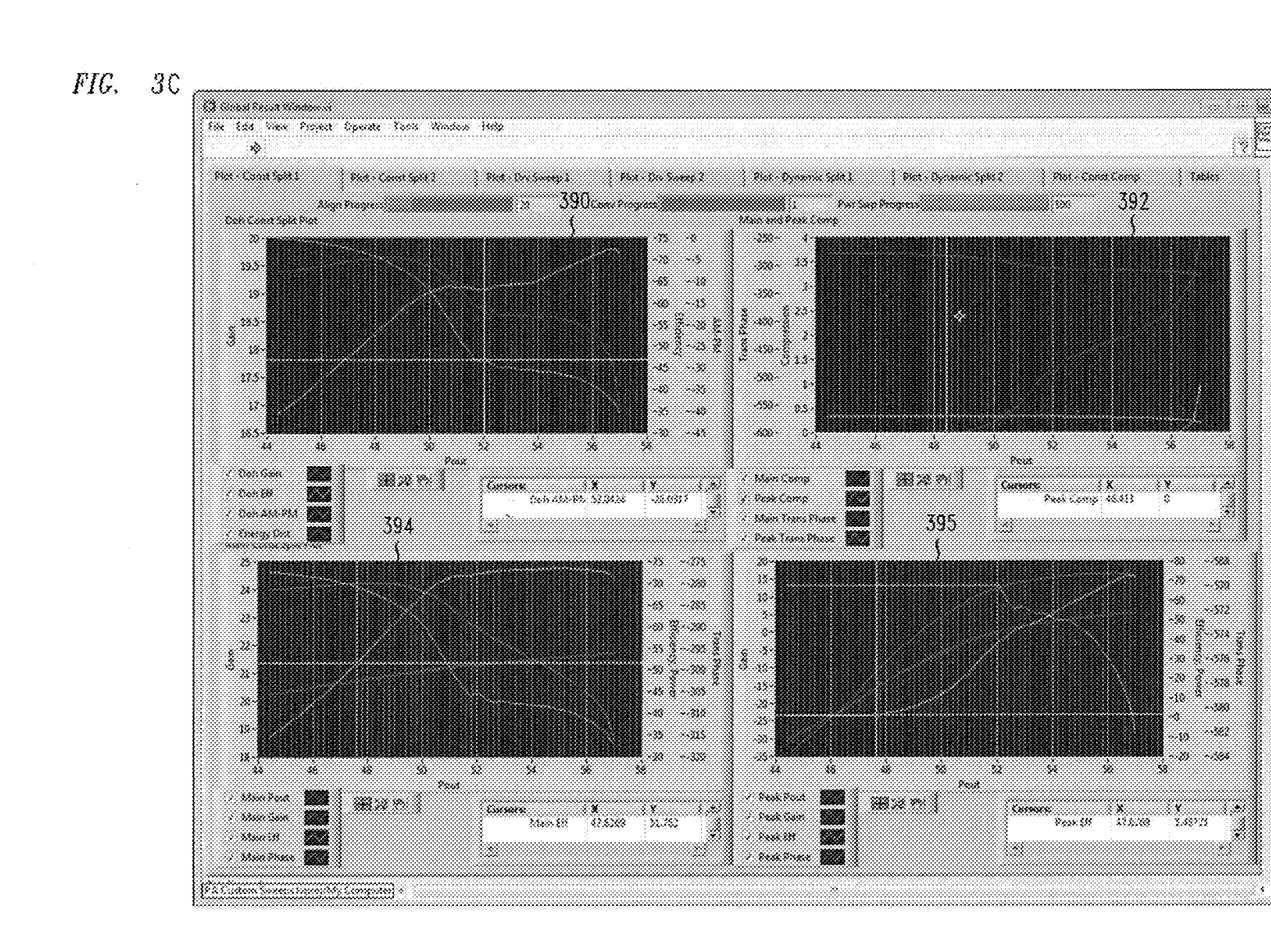

The processor 105 is also configured to cause the display to display plots of the generated output parameters as shown in FIG. 3C. Plots 390 and 394 illustrate plots for a main branch of an amplifier and plots 392 and 395 illustrate plots for a peak branch of the amplifier. Plot 390 illustrates a gain, efficiency and output power plot, plot 392 illustrates a phase, compression and output power plot, plot 394 illustrates a gain, efficiency, phase and output power plot and plot 395 illustrates a gain, efficiency, phase and output power plot. Consequently, a user may compare performances of the main branch and peak branch in a side-by-side fashion.

As described above, example embodiments allow for a design of Doherty and other amplifiers relying on impedance modulation.

Based on the input parameter values obtained by the position of the cursor 315, the selection of impedance points is made by the user. The user moves the cursor 315 and the position of the cursor 315 relative to the load pull contour data determines the selected impedance (impedance and load pull results are shown in section 325). The consequences of the input parameter values and impedance points are then displayed in real time as output parameter values.

The system provides the output parameter values that are displayed in numerical form instantaneous feedback to the user and detailed performance of the amplifier as a whole and of its constituent branches in the form of plots (e.g., FIGS. 3B-3C). While example embodiments have been described with reference to Doherty amplifiers, it should be understood that the amplifier may be a power amplifier such as a single ended, balanced, push-pull, 2-way, 3-way or N-way Doherty amplifier.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

We claim:

1. A method of generating parameters of an amplifier, the method comprising:
   displaying, by a processor, a graphical user interface on a display, the graphical user interface associated with input and output parameters of the amplifier the displaying including,
   displaying possible input parameter values associated with the input parameters, and
   displaying load-pull data associated with the possible input parameters, the load-pull data identifying at least three sets of load-pull data characterizing salient states of active devices in operation of the amplifier, wherein the load-pull data includes (i) load-pull data for a main amplifier branch high efficiency operating mode of the amplifier, (ii) load-pull data for a main amplifier branch high-power operating mode of the amplifier and (iii) load-pull data for a peak amplifier branch high-power operating mode of the amplifier;
   receiving input parameter values for the amplifier;
   generating output parameter values for the amplifier based on the received input parameter values; and
   displaying the generated output values on the display.

2. The method of claim 1, wherein the input parameter values include amplifier performance specifications and an active device characterization of the amplifier, the performance specifications including at least one of power, gain, efficiency and linearity of the amplifier, and the active device characterization being based on the load-pull data.

3. The method of claim 1, wherein the receiving input parameter values includes,
receiving a set of the possible input parameter values, the set including the received input parameter values, each of the values in the set associated with a different input parameter, the selected set identifying impedance points of the amplifier; and
dynamically displaying performance characteristics of the amplifier in response to the selecting.

4. The method of claim 1, wherein the generating includes,
generating design parameter values of the amplifier in real time in response to receiving the input parameter values, the design parameters including impedances presented to active devices of the amplifier, S-parameters of the amplifier and a modulation ratio of the amplifier.

5. The method of claim 1, wherein a number of the input parameters is less than a number of the output parameters.

6. The method of claim 1, wherein the displaying the graphical user interface includes,
displaying first input parameter values alongside second input parameter values, the first input parameter values being for the main amplifier branch of the amplifier and the second input parameter values being for the peak amplifier branch of the amplifier.

7. The method of claim 1, wherein the amplifier is a power amplifier.

8. The method of claim 7, wherein the power amplifier is one of a single ended, balanced, push-pull, 2-way, 3-way and N-way Doherty amplifier.

9. The method of claim 1, further comprising:
building the amplifier based on the generated output parameter values.

10. A system configured to generate parameters of an amplifier, the system comprising:
a processor configured to,
display a graphical user interface on a display, the graphical user interface associated with input and output parameters of the amplifier including,
display possible input parameter values associated with the input parameters, and
display load-pull data associated with the possible input parameters, the load-pull data identifying at least three sets of load-pull data characterizing salient states of active devices in operation of the amplifier, wherein the load-pull data includes (i) load-pull data for a main amplifier branch high efficiency operating mode of the amplifier, (ii) load-pull data for a main amplifier branch high-power operating mode of the amplifier and (iii) load-pull data for a peak amplifier branch high-power operating mode of the amplifier;
receive input parameter values for the amplifier;
generate output parameter values for the amplifier based on the received input parameter values; and
display the generated output values on the display.

11. The system of claim 10, wherein the input parameter values include amplifier performance specifications and an active device characterization of the amplifier, the performance specifications including at least one of power, gain, efficiency and linearity of the amplifier, and the active device characterization being based on load-pull data of the amplifier.

12. The system of claim 10, wherein the processor is configured to receive a set of the possible input parameter values, the set including the received input parameter values, each of the values in the set associated with a different input parameter, the selected set identifying impedance points of the amplifier, and cause the display to dynamically display performance characteristics of the amplifier in response to the selecting.

13. The system of claim 10, wherein the processor is configured to generate design parameter values of the amplifier in real time in response to receiving the input parameter values, the design parameters including impedances presented to active devices of the amplifier, S-parameters of the amplifier and a modulation ratio of the amplifier.

14. The system of claim 10, wherein a number of the input parameters is less than a number of the output parameters.

15. The system of claim 10, the processor is configured to cause the display to display first input parameter values alongside second input parameter values, the first input parameter values being for the main amplifier branch of the amplifier and the second input parameter values being for the peak amplifier branch of the amplifier.

16. The system of claim 10, wherein the amplifier is a power amplifier.

17. The system of claim 16, wherein the power amplifier is one of a single ended, balanced, push-pull, 2-way, 3-way and N-way Doherty amplifier.

* * * * *